United States Patent
Guo

(10) Patent No.: US 11,739,210 B2
(45) Date of Patent: Aug. 29, 2023

(54) POLY(ALIPHATIC ESTER)-POLYCARBONATE FILLED COMPOSITIONS

(71) Applicant: SHPP GLOBAL TECHNOLOGIES B.V., Bergen op Zoom (NL)

(72) Inventor: Mingcheng Guo, Shanghai (CN)

(73) Assignee: SHPP Global Technologies B.V., Bergen op Zoom (NL)

(*) Notice: Subject to any disclaimer, the term of this patent is extended or adjusted under 35 U.S.C. 154(b) by 0 days.

(21) Appl. No.: 17/627,981

(22) PCT Filed: Jul. 17, 2020

(86) PCT No.: PCT/IB2020/056762
§ 371 (c)(1),
(2) Date: Jan. 18, 2022

(87) PCT Pub. No.: WO2021/014317
PCT Pub. Date: Jan. 28, 2021

(65) Prior Publication Data
US 2022/0204812 A1  Jun. 30, 2022

(30) Foreign Application Priority Data
Jul. 19, 2019 (EP) .................. 19187281

(51) Int. Cl.
*C08L 69/00* (2006.01)
*C08K 3/04* (2006.01)

(52) U.S. Cl.
CPC .............. *C08L 69/005* (2013.01); *C08K 3/04* (2013.01); *C08K 2201/001* (2013.01); *C08K 2201/006* (2013.01)

(58) Field of Classification Search
CPC ..... C08L 69/08; C08K 3/04; C08K 2201/001; C08K 2201/006
See application file for complete search history.

(56) References Cited

U.S. PATENT DOCUMENTS

| | | | |
|---|---|---|---|
| 4,621,130 A | 11/1986 | Rosenquist | |
| 7,014,896 B1* | 3/2006 | Miyakawa | B32B 27/36 428/347 |
| 9,187,639 B2 | 11/2015 | Zheng et al. | |
| 10,005,903 B2 | 6/2018 | Morizur et al. | |
| 2011/0204298 A1 | 8/2011 | Chang et al. | |
| 2012/0184661 A1 | 7/2012 | Van Der Mee et al. | |
| 2014/0187689 A1* | 7/2014 | Kim | C08L 69/00 524/502 |
| 2014/0356579 A1 | 12/2014 | Shin et al. | |
| 2015/0069290 A1* | 3/2015 | Guo | C08L 83/10 252/75 |
| 2017/0101530 A1 | 4/2017 | Zheng et al. | |
| 2017/0369702 A1 | 12/2017 | Li et al. | |
| 2020/0010588 A1* | 1/2020 | Kanaya | C08J 5/042 |

FOREIGN PATENT DOCUMENTS

| | | | | |
|---|---|---|---|---|
| CN | 101333338 A | 12/2008 | | |
| CN | 102227473 A | 10/2011 | | |
| CN | 104212143 A | 12/2014 | | |
| CN | 105264017 A | 1/2016 | | |
| JP | S58-316652 A | 8/1983 | | |
| JP | H07-330925 A | 12/1995 | | |
| JP | 2845059 B2 | 1/1999 | | |
| JP | WO 2018/159483 A1 * | 9/2018 | ............ | C08L 101/00 |
| WO | 2019/014302 A1 | 1/2019 | | |

OTHER PUBLICATIONS

International Search Report and Written Opinion dated Aug. 21, 2020 in PCT/IB2020/056762 (10 pgs.).
International Preliminary Report on Patentability dated Jul. 12, 2021 in PCT/IB2020/056762 (8 pgs.).
Lee, H. et al. "Effects of incorporation of polyester on the electrical resistivity of polycarbonate/multi-walled carbon nanotube nanocomposite", Journal of Composite Materials, vol. 53, Issue 10, pp. 1291-1298. (Abstract Only).

* cited by examiner

Primary Examiner — Jane L Stanley
(74) Attorney, Agent, or Firm — Quicker Law, LLC

(57) ABSTRACT

A thermoplastic composition includes, based on the total weight of the composition: from 20 wt % to 90 wt % of a primary thermoplastic resin including a polycarbonate component; from 0.5 wt % to 30 wt % of a functional filler including electrically conductive carbon powder, carbon nanotubes, or a combination thereof; from 0 wt % to 20 wt % of a second thermoplastic resin; and from 0 wt % to 40 wt % of at least one additional additive. The polycarbonate component includes at least 5 wt % of a poly(aliphatic ester)-polycarbonate copolymer based on the total weight of the polycarbonate component, and the combined weight percent value of all components does not exceed 100 wt %. The thermoplastic composition may be useful in, e.g., molded articles, including as a carrier tape for an electronic component.

18 Claims, No Drawings

POLY(ALIPHATIC ESTER)-POLYCARBONATE FILLED COMPOSITIONS

CROSS-REFERENCE TO RELATED APPLICATION

This application is the National Stage of International Application No. PCT/IB2020/056762 filed Jul. 17, 2020, which claims priority to and the benefit of European Application No. 19187281.1 filed Jul. 19, 2019, the disclosures of which are incorporated herein by this reference in their entireties.

FIELD OF THE DISCLOSURE

The present disclosure relates to filled thermoplastic compositions, and in particular to filled thermoplastic compositions that include a poly(aliphatic ester)-polycarbonate copolymer.

BACKGROUND OF THE DISCLOSURE

Many thermoplastic compositions include small additives such as fillers. When these compositions are extruded the additive can migrate and "plate out" onto the extruded part or onto various surfaces of the extrusion mold. This is an undesirable event. Plating out can detract from the visual appearance of the part and can cause extruder down-time as the mold is cleaned up. Plating out can be caused by a lack of miscibility of the additives with the polymer matrix resin.

For thermoplastic compositions including a filler, and in particular for compositions having fillers with a high Brunauer-Emmett-Teller (BET) specific surface area, dispersing agents can be used to facilitate filler dispersion. Polyethylene (PE) wax, Paraffin wax or even polymers such as polyethylene can be used as dispersing agents. Due to a lack of compatibility of these components with certain matrix polymers, however, even the dispersing agent can plate out onto the part or surfaces of the mold, an undesirable result.

Improved thermoplastic compositions that enhance filler dispersion and minimize migration and plating out are therefore desired.

These and other shortcomings are addressed by aspects of the disclosure.

SUMMARY

Aspects of the disclosure relate to thermoplastic compositions including, based on the total weight of the composition: from about 20 wt % to about 90 wt % of a primary thermoplastic resin including a polycarbonate component; from about 0.5 wt % to about 30 wt % of a functional filler; from 0 wt % to about 20 wt % of a second thermoplastic resin; and from 0 wt % to about 40 wt % of at least one additional additive. The polycarbonate component includes at least 5 wt % of a poly(aliphatic ester)-polycarbonate copolymer based on the total weight of the polycarbonate component, and the combined weight percent value of all components does not exceed 100 wt %.

DETAILED DESCRIPTION

The present disclosure can be understood more readily by reference to the following detailed description of the disclosure and the Examples included therein. In various aspects, the present disclosure pertains to thermoplastic compositions including, based on the total weight of the composition: from about 20 wt % to about 90 wt % of a primary thermoplastic resin including a polycarbonate component; from about 0.5 wt % to about 30 wt % of a functional filler; from 0 wt % to about 20 wt % of a second thermoplastic resin; and from 0 wt % to about 40 wt % of at least one additional additive. The polycarbonate component includes at least 5 wt % of a poly(aliphatic ester)-polycarbonate copolymer based on the total weight of the polycarbonate component, and the combined weight percent value of all components does not exceed 100 wt %. The thermoplastic composition may be useful in, e.g., molded articles, including as a carrier tape for an electronic component. In an aspect, the thermoplastic compositions exhibit improved plating performance, impact, ductility and/or tensile properties.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional second thermoplastic resin" means that a second thermoplastic resin can or cannot be included in the composition and that the description includes compositions that both include and that do not include a second thermoplastic resin.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "Mn" can be used interchangeably, and refer to the statistical average molecular weight of all the polymer chains in the sample and is defined by the formula:

$$M_n = \frac{\Sigma N_i M_i}{\Sigma N_i},$$

where Mi is the molecular weight of a chain and Ni is the number of chains of that molecular weight. Mn can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\Sigma N_i M_i^2}{\Sigma N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

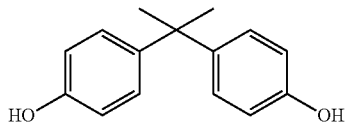 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to thermoplastic compositions including, based on the total weight of the composition: from about 20 wt % to about 90 wt % of a primary thermoplastic resin including a polycarbonate component and from about 0.5 wt % to about 30 wt % of a functional filler. The polycarbonate component includes at least 5 wt % of a poly(aliphatic ester)-polycarbonate copolymer based on the total weight of the polycarbonate component, and the combined weight percent value of all components does not exceed 100 wt %. In some aspects the thermoplastic composition optionally includes greater than 0 wt % to about 20 wt % of a second thermoplastic resin, and/or optionally includes greater than 0 wt % to about 40 wt % of at least one additional additive.

In certain aspects the polycarbonate component includes the poly(aliphatic ester)-polycarbonate copolymer and a polycarbonate homopolymer. The polycarbonate homopolymer may include bisphenol A polycarbonate. The polycarbonate may include in some aspect another polycarbonate copolymer in addition to the poly(aliphatic ester)-polycarbonate copolymer. In further aspects the polycarbonate component may include combinations of these components.

As noted, the thermoplastic compositions include at least 5 wt % of a poly(aliphatic ester)-polycarbonate copolymer based on the total weight of the polycarbonate component. The thermoplastic composition may include from 5 wt % to 100 wt % of the poly(aliphatic ester)-polycarbonate copolymer based on the total weight of the polycarbonate component. In other aspects the thermoplastic composition includes from 10 wt % to 100 wt %, or from 15 wt % to 100 wt %, or from 20 wt % to 100 wt %, or from 25 wt % to 100 wt %, or from 30 wt % to 100 wt %, or from 35 wt % to 100 wt %, or from 40 wt % to 100 wt %, or from 45 wt % to 100 wt %, or from 50 wt % to 100 wt %, or from 55 wt % to 100 wt %, or from 60 wt % to 100 wt %, or from 65 wt % to 100 wt %, or from 70 wt % to 100 wt %, or from 75 wt % to 100 wt %, or from 80 wt % to 100 wt %, or from 85 wt % to 100 wt %, or from 90 wt % to 100 wt %, or from 95 wt % to 100 wt % of the poly(aliphatic ester)-polycarbonate copolymer based on the total weight of the polycarbonate component. In a specific aspect the thermoplastic composition includes about 100 wt % of the poly(aliphatic ester)-polycarbonate copolymer based on the total weight of the polycarbonate component.

The poly(aliphatic ester)-polycarbonate copolymer may include soft block aliphatic dicarboxylic acid ester units. The soft block ester unit can in some aspects be a C6-C20 aliphatic dicarboxylic acid ester unit (where C6-C20 includes the terminal carboxyl groups), and can include straight chain (i.e., unbranched) or branched chain dicarboxylic acids. The poly(aliphatic ester)-polycarbonate can include less than or equal to 25 wt % of a soft block unit. Exemplary dicarboxylic acids include: alpha, omega C6 dicarboxylic acids such as hexanedioic acid (also referred to as adipic acid); alpha and omega C10 dicarboxylic acids such as decanedioic acid (also referred to as sebacic acid); alpha and omega C12 dicarboxylic acids such as dodecanedioic acid (sometimes abbreviated as DDDA). The poly (aliphatic ester)-polycarbonate copolymer may include repeating units derived from aliphatic dicarboxylic acid and BPA.

The thermoplastic composition includes from about 0.5 wt % to about 30 wt % of the functional filler. In some aspects the thermoplastic composition includes from about 1 wt % to about 30 wt %, or from about 5 wt % to about 30 wt %, or from about 10 wt % to about 30 wt % of the functional filler.

Any suitable functional filler may be used. In certain aspect the functional filler includes electrically conductive carbon powder, carbon nanotubes, or a combination thereof. The electrically conductive carbon powder, if used, may have a Brunauer-Emmett-Teller (BET) specific surface area of at least 50 square meters per gram ($m^2/g$) and an oil absorption number (OAN) as determined in accordance with ASTM D2414 of at least about 150 milliliters per 100 grams (mL/100 g). The carbon nanotubes, if used, may include single-walled or multi-walled carbon nanotubes having a specific surface area (SSA) of at least 100 m²/g, an outside diameter of less than about 20 nanometer (nm) and a length of less than about 100 micron (μm). During formation of the thermoplastic composition the functional filler (e.g., carbon nanotubes) may be added to the primary thermoplastic resin in the form of a masterbatch or concentrate.

In some aspects the thermoplastic composition optionally includes from greater than 0 wt % to about 20 wt % of the second thermoplastic resin, such as from about 0.01 wt % to about 20 wt %, or from about 0.1 wt % to about 20 wt %, or from 1 wt % to about 20 wt %, or from 5 wt % to about 20 wt %, or from 10 wt % to about 20 wt % of the second thermoplastic resin. Any suitable thermoplastic resin or combination of resins—including copolymers thereof—may be included as the second thermoplastic resin.

In a certain aspect the second thermoplastic resin includes a polyalkylene terephthalate polymer. The polyalkylene terephthalate polymer may include, but is not limited to, polyethylene terephthalate (PET), poly(1,4-butylene terephthalate) (PBT), poly(propylene terephthalate) (PPT), a poly(alkylene naphthoate) polymer, poly(ethylene naphthanoate) (PEN), poly(butylene naphthanoate) (PBN), a poly(cycloalkylene diester) polymer, poly(cyclohexanedimethylene terephthalate) (PCT), copolymers thereof, and combinations thereof.

In some aspects the thermoplastic composition includes from greater than 0 wt % to about 40 wt % of the at least one additional additive, such as from 0.01 wt % to about 40 wt % of the at least one additional additive, or from about 0.1 wt % to about 40 wt %, or from about 1 wt % to about 40 wt % of the at least one additional additive.

In certain aspects the at least one additional additive includes an additional polymer, an impact modifier, a flame retardant, or a combination thereof. The additional polymer or the impact modifier may include, but is not limited to, ethylene-propylene (EP) rubber, ethylene propylene diene monomer (EPDM), maleic-anhydride (MAH) grafted EP copolymer; MAH grafted polyethylene, acrylic rubber (ACR), methylmethacrylate-butadiene-styrene (MBS) terpolymer, ethylene-co-glycidyl methacrylate (EGMA), ethylene-methyl acrylate-glycidyl methacrylate (EMAGMA), poly(styrene-butadiene-styrene) SBS, poly(styrene-ethylene-butadiene-styrene) (SEBS), polyester ether elastomer, ethylene ethyl acrylate, and combinations thereof.

The flame retardant may include a phosphorous-containing flame retardant. Exemplary phosphorous-containing flame retardants include, but are not limited to, bisphenol A bis(diphenyl phosphate) (BPADP), resorcinol bis (diphenyl phosphate) (RDP), triphenyl phosphate (TPP), melamine polyphosphate (MPP), phosphazene, and combinations thereof.

In further aspects the at least one additional additive may include at least one further additive selected from a pigment, a processing aid, a flow promoter, a de-molding agent, a thermal stabilizer, a light stabilizer, a UV-resistant additive, a UV-absorbent additive, an anti-dripping agent, and combinations thereof.

Properties of the Thermoplastic Compositions

The thermoplastic compositions have improved properties as compared to reference (comparative) compositions that do not include the poly(aliphatic ester)-polycarbonate copolymer. As used herein a "reference composition" is a composition that has the same components, and in the same amounts, as the example composition, but the reference composition does not include the recited component (e.g., the poly(aliphatic ester)-polycarbonate copolymer). The component removed from the reference composition is replaced by the same amount of a conventional polycarbonate component (e.g., a polycarbonate homopolymer such as bisphenol A).

In some aspects the thermoplastic composition has improved plating performance as compared to a reference composition that includes polycarbonate homopolymer instead of the poly(aliphatic ester)-polycarbonate copolymer. Improved plating performance can be observed by a reduction in plating out of the composition onto surfaces of the equipment used to form the composition (e.g., extrusion and/or injection molding equipment). For example, while conventional compositions that do not include the poly (aliphatic ester)-polycarbonate copolymer may plate out onto surfaces of equipment after 8-12 hours of continuous extrusion/molding operations, in some aspects the example compositions according to the present disclosure (which include the poly(aliphatic ester)-polycarbonate copolymer) do not plate out after 12 hours of continuous operations. Plating out performance is thus improved in the disclosed compositions.

In further aspects the thermoplastic compositions have improved impact properties as compared to a reference composition that includes polycarbonate homopolymer instead of the poly(aliphatic ester)-polycarbonate copolymer. Impact properties that may be improved include notched Izod impact strength as tested at 23 degrees Celsius (° C.) in accordance with ASTM D256 and ASTM D4812 and unnotched Izod impact strength as tested at 23° C. in accordance with ASTM D256 and ASTM D4812. Improved notched Izod impact strength may include in some aspects an improvement of at least 10%, or at least 15% or at least 20%, or at least 25% as compared to the reference composition. Improved unnotched Izod impact strength may include in some aspects an improvement of at least 10%, or at least 15%, or at least 20%, or at least 25% as compared to the reference composition.

In certain aspects the thermoplastic compositions have improved ductility properties as compared to a reference composition that includes polycarbonate homopolymer instead of the poly(aliphatic ester)-polycarbonate copolymer. Improved ductility may include in some aspects an improvement of at least 10%, or at least 15%, or at least 20%, or at least 25%, or at least 30%, or at least 35% as compared to the reference composition.

In further aspects the thermoplastic compositions have improved tensile elongation at break properties as compared to a reference composition that includes polycarbonate homopolymer instead of the poly(aliphatic ester)-polycarbonate copolymer. Improved tensile elongation at break may include in certain aspects an improvement of at least 20%, or at least 40%, or at least 50%, or at least 75%, or at least 100%, or at least 125%, or at least 150%, or at least 175%, or at least 200% as compared to the reference composition.

In yet further aspects the thermoplastic compositions have improved electrical conductivity properties. Improved electrical conductivity properties may be evaluated by determining the surface resistivity of the compositions, as described in the Examples. Specifically, the compositions may have a lower surface resistivity as compared to a reference composition that does not include the second thermoplastic resin. In some aspects surface resistivity is reduced by a factor of at least 100, or by a factor of at least 150, by a factor of at least 200, by a factor of at least 250, by a factor of at least 300, by a factor of at least 350, by a factor of at least 400, by a factor of at least 450, or by a factor of at least 500 as compared to the reference composition. Further, even without inclusion of the second thermoplastic resin, surface resistivity of the compositions according to the disclosure may be comparable—within one order of magnitude—as compared to a reference composition that does not include the poly(aliphatic ester)-polycarbonate copolymer.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded or extrusion molded.

In particular aspects the article is a carrier tape for an electronic component.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of, based on the total weight of the composition:
from about 20 wt % to about 90 wt % of a primary thermoplastic resin comprising a polycarbonate component;
from about 0.5 wt % to about 30 wt % of a functional filler;
from 0 wt % to about 20 wt % of a second thermoplastic resin; and
from 0 wt % to about 40 wt % of at least one additional additive,
wherein the polycarbonate component comprises at least 5 wt % of a poly(aliphatic ester)-polycarbonate copolymer based on the total weight of the polycarbonate component, and wherein the combined weight percent value of all components does not exceed 100 wt %.

Aspect 2. The thermoplastic composition according to Aspect 1, wherein the polycarbonate component comprises the poly(aliphatic ester)-polycarbonate copolymer and a polycarbonate homopolymer.

Aspect 3. The thermoplastic composition according to Aspect 2, wherein the polycarbonate homopolymer comprises bisphenol-A.

Aspect 4. The thermoplastic composition according to Aspect 1, wherein the polycarbonate component comprises 100 wt % of the poly(aliphatic ester)-polycarbonate copolymer based on the total weight of the polycarbonate component.

Aspect 5. The thermoplastic composition according to any of Aspects 1 to 4, wherein the thermoplastic composition comprises from greater than 0 wt % to about 20 wt % of the second thermoplastic resin, and the second thermoplastic resin comprises a polyalkylene terephthalate polymer.

Aspect 6. The thermoplastic composition according to Aspect 5, wherein the polyalkylene terephthalate polymer comprises polyethylene terephthalate (PET), poly(1,4-butylene terephthalate) (PBT), poly(propylene terephthalate) (PPT), a poly(alkylene naphthoate) polymer, poly(ethylene naphthanoate) (PEN), poly(butylene naphthanoate) (PBN), a poly(cycloalkylene diester) polymer, poly(cyclohexanedimethylene terephthalate) (PCT), copolymers thereof, or a combination thereof.

Aspect 7. The thermoplastic composition according to any of Aspects 1-6, wherein the functional filler comprises electrically conductive carbon powder, carbon nanotubes, or a combination thereof.

Aspect 8. The thermoplastic composition according to Aspect 7, wherein the functional filler comprises electrically conductive carbon powder, and the conductive carbon power has a Brunauer-Emmett-Teller (BET) specific surface area of at least 50 square meters per gram ($m^2/g$) and an oil absorption number (OAN) as determined in accordance with ASTM D2414 of at least about 150 milliliters per 100 grams (mL/100 g).

Aspect 9. The thermoplastic composition according to Aspect 7 or 8, wherein the functional filler comprises carbon nanotubes, and the carbon nanotubes comprise single-walled or multi-walled carbon nanotubes having a specific surface area (SSA) of at least 100 $m^2/g$, an outside diameter of less than about 20 nanometer (nm) and a length of less than about 100 micron (μm).

Aspect 10. The thermoplastic composition according to any of Aspects 1 to 9, wherein the thermoplastic composition comprises from greater than 0 wt % to about 40 wt % of the at least one additional additive, and the at least one additional additive comprises an additional polymer, an impact modifier, a flame retardant, or a combination thereof.

Aspect 11. The thermoplastic composition according to Aspect 10, wherein at least one additional additive comprises the additional polymer or the impact modifier, and the additional polymer or the impact modifier comprises ethylene-propylene (EP) rubber, ethylene propylene diene monomer (EPDM), maleic-anhydride (MAH) grafted EP copolymer; MAH grafted polyethylene, acrylic rubber (ACR), methylmethacrylate-butadiene-styrene (MBS) terpolymer, ethylene-co-glycidyl methacrylate (EGMA), ethylene-methyl acrylate-glycidyl methacrylate (EMAGMA), poly (styrene-butadiene-styrene) SBS, poly(styrene-ethylene-butadiene-styrene) (SEBS), polyester ether elastomer, ethylene ethyl acrylate, or a combination thereof.

Aspect 12. The thermoplastic composition according to Aspect 10 or 11, wherein at least one additional additive comprises the flame retardant, and the flame retardant comprises a phosphorous-containing flame retardant.

Aspect 13. The thermoplastic composition according to Aspect 12, wherein the phosphorous-containing flame retardant comprises bisphenol A bis(diphenyl phosphate) (BPADP), resorcinol bis (diphenyl phosphate) (RDP), triphenyl phosphate (TPP), melamine polyphosphate (MPP), phosphazene, or a combination thereof.

Aspect 14. The thermoplastic composition according to any of Aspects 10 to 13, wherein the at least one additional additive comprises at least one further additive selected from a pigment, a processing aid, a flow promoter, a de-molding agent, a thermal stabilizer, a light stabilizer, a UV-resistant additive, a UV-absorbent additive, an anti-dripping agent, or a combination thereof.

Aspect 15. The thermoplastic composition according to any of Aspects 1 to 14, wherein the composition has improved plating performance as compared to a reference composition that includes polycarbonate homopolymer instead of the poly(aliphatic ester)-polycarbonate copolymer.

Aspect 16. The thermoplastic composition according to any of Aspects 1 to 15, wherein the composition has:
an improved notched Izod impact strength as tested at 23° C. in accordance with ASTM D256 and ASTM D4812;
an improved unnotched Izod impact strength as tested at 23° C. in accordance with ASTM D256 and ASTM D4812;
an improved ductility as tested in accordance with ASTM D256 and ASTM D4812; or
an improved tensile elongation at break as tested in accordance with ASTM D638, as compared to a reference composition that includes polycarbonate homopolymer instead of the poly(aliphatic ester)-polycarbonate copolymer.

Aspect 17. An article formed from the thermoplastic composition according to any of Aspects 1 to 16.

Aspect 18. The article of Aspect 17, wherein the article is a carrier tape for an electronic component.

Aspect 19. The article according to Aspect 17 or 18, wherein the article is injection molded or extrusion molded from the thermoplastic composition.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The compositions were prepared by twin-screw extruder compounding and injection molding processes under conventional polycarbonate processing conditions. Specifically, samples were prepared using a twin-screw extruder (Toshiba TEM-37BS, length/diameter (L/D)=40.5). The temperature of the extruder barrel was set at 245-265 degrees Celsius (° C.), the extrusion speed was 300 revolutions per minute (RPM) and the output rate was 30 kilograms per hour (kg/hr). Pellets extruded from the extruder were then injection molded into conventional testing bars for the tests described herein.

Melt Flow Rate (MFR) was tested and data obtained in accordance with ASTM D 1238.

Notched Izod Impact (NII) and Unnotched Izod Impact (UNI) were tested at room temperature (23° C.) and data obtained in accordance with ASTM D256 and ASTM D4812, respectively.

Density was tested and data obtained in accordance with ASTM D792.

Tensile properties were tested and data was obtained in accordance with ASTM D638.

Surface resistivity was tested and data obtained in accordance with ASTM D257.

Table 1 lists the components used in the compositions described herein.

TABLE 1

Components used

| Component | Chemical description | CAS | Source |
|---|---|---|---|
| HFD PC high Mw | Sebacic acid/BPA/PCP polyestercarbonate, Mw 21400 | 137397-37-6 | SABIC |
| HFD PC low Mw | Sebacic acid/BPA/PCP polyestercarbonate, Mw 36500 | 137397-37-6 | SABIC |
| Low Fries PC (High Mw) | Low Fries PC (High Mw), Mw 30500 | 111211-39-3 | SABIC |
| Low Fries PC (Low Mw) | Low Fries PC (Low Mw), Mw 21800 | 111211-39-3 | SABIC |
| EXL3330 | Acrylic polymer, impact modifier | 25852-37-3, 471-34-1 | Rohm Haas |
| 1100X | PBT, High Viscosity | 26062-94-2 | Changchun Plastic Co., Ltd. |
| ENSACO 250G | Conductive carbon powder | 1333-86-4 | IMERYS |
| PETs | Pentaerythritol tetrastearate | 115-83-3 | Faci Asia Pacific PTE, Ltd. |

*All Mw's measured by gel permeation chromatography based on BPA PC standards

Comparative (C1) and example compositions (E1-E5) were formed in accordance with Table 2 and had the listed properties:

TABLE 2

Compositions and properties

| Component | Unit | C1 | E1 | E2 | E3 | E4 | E5 |
|---|---|---|---|---|---|---|---|
| Low Fries PC (High Mw) | % | 62.4 | 42.4 | 20 | | | |
| Low Fries PC (Low Mw) | % | 20.8 | 20.8 | 20.8 | 20.8 | | |
| Sebacic acid/BPA/PCP polyestercarbonate | % | | 20 | 42.4 | 62.4 | 62.4 | 61.9 |
| Sebacic acid/BPA/PCP polyestercarbonate | % | | | | | 20.8 | 20.8 |
| Acrylic polymer impact modifier | % | 4 | 4 | 4 | 4 | 4 | 4 |
| PBT, High Viscosity, 1100X | % | | | | | | 0.5 |
| Conductive carbon powder | % | 12.5 | 12.5 | 12.5 | 12.5 | 12.5 | 12.5 |
| Pentaerythritol tetrastearate (PETS) | % | 0.3 | 0.3 | 0.3 | 0.3 | 0.3 | 0.3 |
| Properties | | | | | | | |
| MFR-Avg (300C/1.2 kg/360 s) | g/10 min | 6.0 | 6.0 | 5.9 | 5.6 | 6.0 | 8.5 |
| Surface Resistivity-average | Ohm/Sq | 1E+13 | 2E+13 | 1.5E+13 | 2E+13 | 4E+13 | 7.5E+10 |
| Notched Izod Impact Strength-Avg (RT/N/5 lbf/ft) | J/m | 101 | 117 | 118 | 119 | 128 | 102 |
| Unnotched Izod Impact Strength Ductility | % | 80 | 100 | 100 | 100 | 100 | 100 |
| Unnotched Izod Impact Strength-Avg | J/m | 1800 | 2100 | 2100 | 2100 | 2100 | 2100 |
| Modulus of Elasticity-Avg | MPa | 2722 | 2685 | 2676.5 | 2647 | 2608 | 2656 |
| Stress at Yield-Avg | MPa | 58.3 | 57.6 | 56.9 | 55.9 | 55.5 | 56.2 |
| Stress at Break-Avg | MPa | 48.5 | 47.6 | 46.4 | 46.5 | 46.4 | 44.3 |
| Elongation at Yield-Avg | % | 4.3 | 4.2 | 4 | 4 | 3.9 | 3.8 |
| Elongation at Break-Avg | % | 9.5 | 14 | 12 | 19.8 | 28.6 | 12.1 |
| Density-Avg | — | 1.245 | 1.244 | 1.242 | 1.24 | 1.237 | 1.238 |

As shown in the data, example composition E1 including the HFD PC (poly(aliphatic ester)-polycarbonate copolymer) has improved impact strength, ductility and tensile elongation at break as compared to the reference/comparative composition C1 that does not include the HFD PC (poly(aliphatic ester)-polycarbonate copolymer). As shown in example compositions E1 to E4, as the HFD PC loading increases, high impact strength and good ductility properties are maintained. In addition, the surface resistivity of example compositions E1 to E4 was comparable—within one order of magnitude—as compared to reference composition C1 that does not include the poly(aliphatic ester)-polycarbonate copolymer. This indicates that good electrical conductivity of the example compositions is maintained as compared to the reference composition. Further, in example composition E5, when a second resin (PBT) was added, good ductility properties were maintained, while surface resistivity was regulated; surface resistivity was reduced, indicating an improvement in electrical conductivity properties.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as durhard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A thermoplastic composition comprising, based on the total weight of the composition:
   from 20 wt % to 90 wt % of a primary thermoplastic resin comprising a polycarbonate component;
   from 0.5 wt % to 30 wt % of a functional filler comprising electrically conductive carbon powder, carbon nanotubes, or a combination thereof;
   from 0 wt % to 20 wt % of a second thermoplastic resin; and
   from 0 wt % to 40 wt % of at least one additional additive,
   wherein the polycarbonate component comprises at least 20 wt % of a poly(aliphatic ester)-polycarbonate copolymer component based on the total weight of the polycarbonate component,
   wherein the poly(aliphatic ester)-polycarbonate copolymer component comprises a first poly(aliphatic ester)-polycarbonate copolymer having a first molecular weight M1 and a second poly(aliphatic ester)-polycarbonate copolymer having a second molecular weight M2,
   wherein M1 and M2 are different, and
   wherein the combined weight percent value of all components does not exceed 100 wt %.

2. The thermoplastic composition according to claim 1, wherein the polycarbonate component comprises the poly(aliphatic ester)-polycarbonate copolymer component and further comprises a polycarbonate homopolymer.

3. The thermoplastic composition according to claim 2, wherein the polycarbonate homopolymer comprises bisphenol-A.

4. The thermoplastic composition according to claim 1, wherein the polycarbonate component comprises 100 wt % of the poly(aliphatic ester)-polycarbonate copolymer component based on the total weight of the polycarbonate component.

5. The thermoplastic composition according to claim 1, wherein the thermoplastic composition comprises from greater than 0 wt % to 20 wt % of the second thermoplastic resin, and the second thermoplastic resin comprises a polyalkylene terephthalate polymer.

6. The thermoplastic composition according to claim 5, wherein the polyalkylene terephthalate polymer comprises polyethylene terephthalate (PET), poly(1,4-butylene terephthalate) (PBT), poly(propylene terephthalate) (PPT), a poly(alkylene naphthoate) polymer, poly(ethylene naphthanoate) (PEN), poly(butylene naphthanoate) (PBN), a poly(cycloalkylene diester) polymer, poly(cyclohexanedimethylene terephthalate) (PCT), copolymers thereof, or a combination thereof.

7. The thermoplastic composition according to claim 1, wherein the functional filler comprises electrically conductive carbon powder, and the conductive carbon power has a Brunauer-Emmett-Teller (BET) specific surface area of at least 50 square meters per gram ($m^2/g$) and an oil absorption number (OAN) as determined in accordance with ASTM D2414 of at least 150 milliliters per 100 grams (mL/100 g).

8. The thermoplastic composition according to claim 1, wherein the functional filler comprises carbon nanotubes, and the carbon nanotubes comprise single-walled or multi-walled carbon nanotubes having a specific surface area (SSA) of at least 100 $m^2/g$, an outside diameter of less than 20 nanometer (nm) and a length of less than 100 micron (µm).

9. The thermoplastic composition according to claim 1, wherein the thermoplastic composition comprises from greater than 0 wt % to 40 wt % of the at least one additional additive, and the at least one additional additive comprises an additional polymer, an impact modifier, a flame retardant, or a combination thereof.

10. The thermoplastic composition according to claim 9, wherein at least one additional additive comprises the additional polymer or the impact modifier, and the additional polymer or the impact modifier comprises ethylene-propylene (EP) rubber, ethylene propylene diene monomer (EPDM), maleic-anhydride (MAH) grafted EP copolymer; MAH grafted polyethylene, acrylic rubber (ACR), methyl-methacrylate-butadiene-styrene (MBS) terpolymer, ethylene-co-glycidyl methacrylate (EGMA), ethylene-methyl acrylate-glycidyl methacrylate (EMAGMA), poly(styrene-butadiene-styrene) SBS, poly(styrene-ethylene-butadiene-styrene) (SEBS), polyester ether elastomer, ethylene ethyl acrylate, or a combination thereof.

11. The thermoplastic composition according to claim 9, wherein at least one additional additive comprises the flame retardant, and the flame retardant comprises a phosphorous-containing flame retardant comprising bisphenol A bis(diphenyl phosphate) (BPADP), resorcinol bis (diphenyl phosphate) (RDP), triphenyl phosphate (TPP), melamine polyphosphate (MPP), phosphazene, or a combination thereof.

12. The thermoplastic composition according to claim 9, wherein the at least one additional additive comprises at least one further additive selected from a pigment, a processing aid, a flow promoter, a de-molding agent, a thermal stabilizer, a light stabilizer, a UV-resistant additive, a UV-absorbent additive, an anti-dripping agent, or a combination thereof.

13. The thermoplastic composition according to claim 1, wherein the composition has:
   an improved plating performance as compared to a reference composition that includes polycarbonate homopolymer instead of the poly(aliphatic ester)-polycarbonate copolymer component;
   an improved notched Izod impact strength as tested at 23° C. in accordance with ASTM D256 and ASTM D4812 as compared to a reference composition that includes polycarbonate homopolymer instead of the poly(aliphatic ester)-polycarbonate copolymer component;

an improved unnotched Izod impact strength as tested at 23° C. in accordance with ASTM D256 and ASTM D4812 as compared to a reference composition that includes polycarbonate homopolymer instead of the poly(aliphatic ester)-polycarbonate copolymer component;

an improved ductility as tested in accordance with ASTM D256 and ASTM D4812 as compared to a reference composition that includes polycarbonate homopolymer instead of the poly(aliphatic ester)-polycarbonate copolymer component; or an improved tensile elongation at break as tested in accordance with ASTM D638 as compared to a reference composition that includes polycarbonate homopolymer instead of the poly(aliphatic ester)-polycarbonate copolymer component.

14. An article formed from the thermoplastic composition according to claim 1, wherein the article is a carrier tape for an electronic component.

15. The thermoplastic composition according to claim 1, wherein the composition comprises at least 60 wt % of the poly(aliphatic ester)-polycarbonate copolymer component based on the total weight of the polycarbonate component.

16. The thermoplastic composition according to claim 1, wherein the composition comprises at least 80 wt % of the poly(aliphatic ester)-polycarbonate copolymer component based on the total weight of the polycarbonate component.

17. The thermoplastic composition according to claim 16, wherein the composition has an improved notched Izod impact strength as tested at 23° C. in accordance with ASTM D256 and ASTM D4812 as compared to a reference composition that includes polycarbonate homopolymer instead of the poly(aliphatic ester)-polycarbonate copolymer component.

18. The thermoplastic composition according to claim 1, wherein M1 is about 21,400 and M2 is about 36,500.

* * * * *